(12) United States Patent
Simpson et al.

(10) Patent No.: US 10,452,568 B2
(45) Date of Patent: Oct. 22, 2019

(54) PERIPHERAL DEVICE LISTS

(71) Applicant: Hewlett-Packard Development Company, L.P., Houston, TX (US)

(72) Inventors: Shell S Simpson, Boise, ID (US); Timothy P Blair, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/762,905

(22) PCT Filed: Nov. 24, 2015

(86) PCT No.: PCT/US2015/062280
§ 371 (c)(1),
(2) Date: Mar. 23, 2018

(87) PCT Pub. No.: WO2017/091205
PCT Pub. Date: Jun. 1, 2017

(65) Prior Publication Data
US 2018/0276147 A1   Sep. 27, 2018

(51) Int. Cl.
| | |
|---|---|
| *G06F 13/14* | (2006.01) |
| *G06F 13/10* | (2006.01) |
| *G06F 3/12* | (2006.01) |
| *H04N 1/00* | (2006.01) |
| *G06F 13/38* | (2006.01) |

(52) U.S. Cl.
CPC .......... *G06F 13/102* (2013.01); *G06F 3/1204* (2013.01); *G06F 3/1222* (2013.01); *G06F 3/1226* (2013.01); *G06F 3/1231* (2013.01); *G06F 3/1238* (2013.01); *G06F 13/14* (2013.01); *G06F 13/385* (2013.01); *H04N 1/00474* (2013.01); *H04N 1/00506* (2013.01)

(58) Field of Classification Search
CPC ...... G06F 3/1204; G06F 3/1226; G06F 13/10; G06F 13/102; H04N 1/00474
See application file for complete search history.

(56) References Cited

U.S. PATENT DOCUMENTS

| | | |
|---|---|---|
| 6,920,506 B2 | 7/2005 | Barnard et al. |
| 8,065,436 B2 | 11/2011 | Asthana et al. |
| 8,189,220 B2 | 5/2012 | Subramanian |
| (Continued) | | |

FOREIGN PATENT DOCUMENTS

WO   WO-20001055189 A2   5/2006

OTHER PUBLICATIONS

Xerox Corporation, Xerox® Mobile Print Cloud Administrator How to and Troubleshooting Guide May 2015 ~ 92 pages.

*Primary Examiner* — Henry Tsai
*Assistant Examiner* — Christopher Daley
(74) *Attorney, Agent, or Firm* — HP Inc. Patent Department

(57) ABSTRACT

Examples disclosed herein relate to capturing a first machine-readable link via an image capture device, retrieving a first content element associated with the first machine-readable link, determining whether the first content element is related to a second content element associated with a second machine-readable link, and in response to determining that the first content element is related to the second content element associated with a second machine-readable link, retrieving the second content element.

15 Claims, 3 Drawing Sheets

(56) References Cited

U.S. PATENT DOCUMENTS

| | | |
|---|---|---|
| 8,610,927 B2 | 12/2013 | Sweet et al. |
| 10,116,505 B2 * | 10/2018 | Kim ................... H04L 41/082 |
| 2010/0062711 A1 | 3/2010 | Park |
| 2012/0005298 A1 * | 1/2012 | Choi ................... H04L 61/106 |
| | | 709/208 |
| 2012/0023265 A1 | 1/2012 | Liao |
| 2013/0176565 A1 | 7/2013 | Meade et al. |
| 2013/0179565 A1 * | 7/2013 | Hart ................... H04L 41/0681 |
| | | 709/224 |
| 2014/0118775 A1 | 5/2014 | Motamed et al. |
| 2014/0146745 A1 * | 5/2014 | Huang ................... H04L 63/20 |
| | | 370/328 |
| 2015/0103373 A1 | 4/2015 | Juchem et al. |

\* cited by examiner

PERIPHERAL DEVICE LISTS

BACKGROUND

In some situations, an environment such as an office building may have several peripheral devices available for use. Such peripherals may comprise printers, scanners, copiers, multi-function devices, etc. A user may connect to some and/or all of these devices via a direct connections, such as a USB cable, or via another communications connection, such as by Bluetooth and/or wired or wireless network.

BRIEF DESCRIPTION OF THE DRAWINGS

In the accompanying drawings, like numerals refer to like components or blocks. The following detailed description references the drawings, wherein.

DETAILED DESCRIPTION

In some environments, multiple peripheral devices such as printers, scanners, copiers, fax machines, multi-function devices (MFDs) may be shared among users. For example, an office may have four printers, two of which offer color printing and one of which allows for duplex printing. It is often time-consuming and aggravating for a user to install and configure all of the different peripherals that they may wish to use with multiple devices (e.g., mobile device, tablet, laptop, and/or desktop computer, etc.). Furthermore, some devices may be connected directly (e.g., USB, serial, firewire, and/or other cables), while some devices may be connected by short-range communication (e.g., Bluetooth) and/or on different network segments.

Agents installed on the peripheral devices and/or the user devices may help alleviate this aggravation by collecting information about peripheral devices installed and/or available. The information may comprise characteristics such as serial numbers, network addresses, device features, model numbers, device names, etc. The agents may provide the information they collect to a central management agent, such as may be contacted via a network. Such a central management agent may execute on a local server and/or be located off-premises. The central management agent may be associated with a particular enterprise or organization and/or may comprise a publicly accessible service.

The central management agent may match characteristics among the various peripheral devices to generate an aggregated list of devices available to a particular user device. Each local agent may report discovery information about peripheral devices to the central management agent. The central management agent may detect which agents reside in the same customer environment by comparing discovery information between local agents. The central management agent may then group devices that were discovered by local agents determined to reside in the same customer environment. A user may then retrieve the list of grouped peripheral devices along with installation and/or configuration information in order to interact with any of the available peripheral devices.

Figure 1:
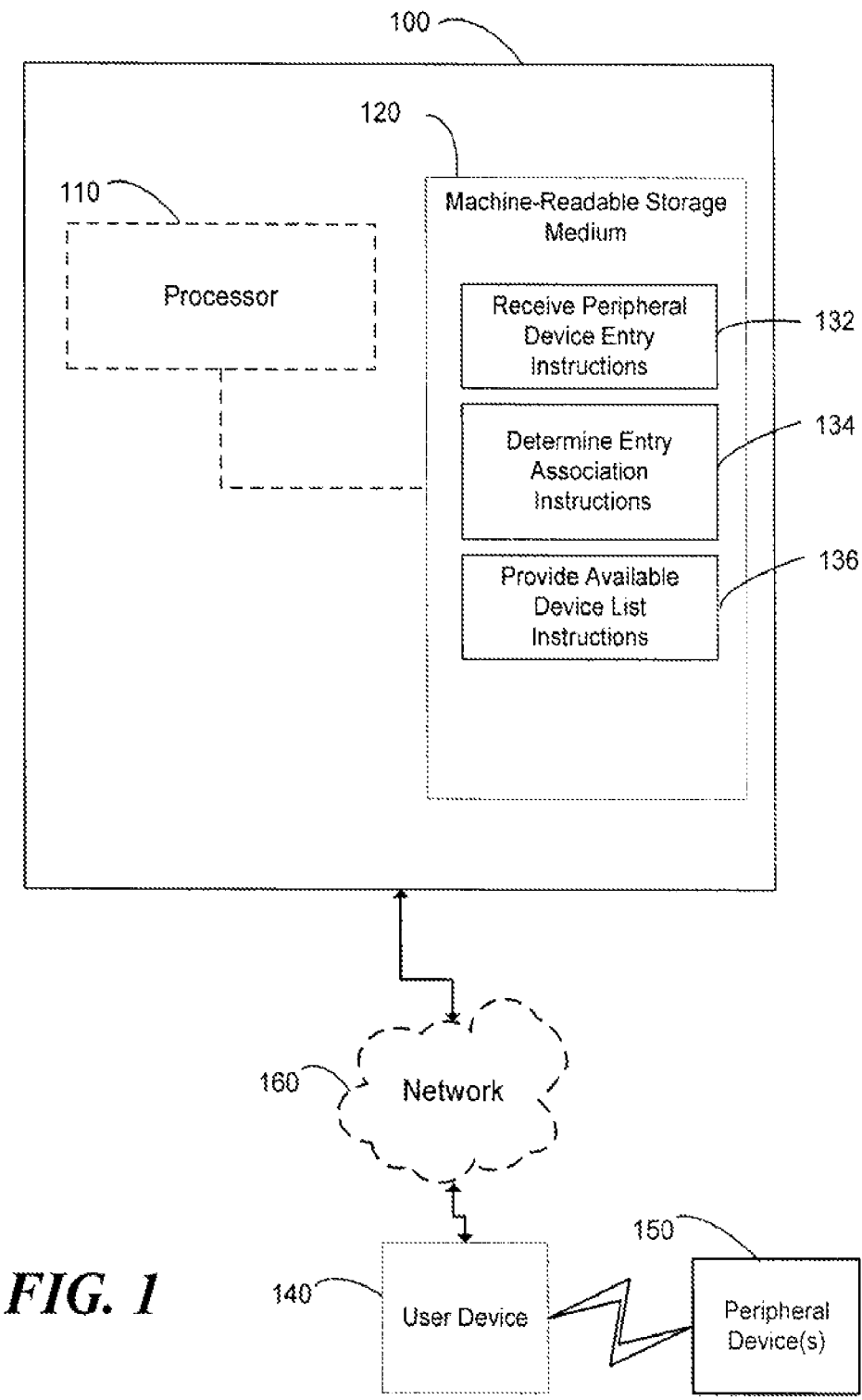
FIG. 1 is a block diagram of an example peripheral listing device.

Referring now to the drawings, FIG. 1 is a block diagram of an example peripheral listing device 100 consistent with disclosed implementations. Peripheral listing device 100 may comprise a processor 110 and a non-transitory machine-readable storage medium 120. Peripheral listing device 100 may comprise a computing device such as a server computer, a desktop computer, a laptop computer, a handheld computing device, a smart phone, a tablet computing device, a mobile phone, a network device (e.g., a switch and/or router), or the like.

Processor 110 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 120. In particular, processor 110 may fetch, decode, and execute a plurality of receive peripheral device entry instructions 132, determine entry association instructions 134, and provide available device list instructions 136 to implement the functionality described in detail below.

Executable instructions may comprise logic stored in any portion and/or component of machine-readable storage medium 120 and executable by processor 110. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive peripheral device entry instructions 132 may receive a first peripheral device entry from a local agent. The local agent may comprise software executing on a user device 140 and/or a peripheral device 150. User device 140 may comprise, for example, a computer, laptop, smart phone, tablet, PDA, etc. User device 140 may scan for available peripheral devices in communication with the user device 140, such as by a physical connection (e.g., USB, FireWire, parallel, network, and/or serial cable) and/or by a wireless connection (e.g., WiFi and/or BlueTooth). In some implementations, the scan may be performed by a local software agent. Such an agent may execute on the peripheral device itself and/or on user device 140. For example, the agent may be installed at the same time a driver for the peripheral device is installed on user device 140.

User device 140 may, upon detection of an available peripheral device 150, generate a peripheral device entry associated with peripheral device 150. The entry may then be communicated to device 100 via a communications medium such as a network 160. For example, the entry may comprise a plurality of metadata about peripheral device 150, such as the identifying agent, model number, features, MAC address, IP address, serial number, network name, and/or other identifying characteristics. Agent software executing on user device 140 may collect the metadata information for the peripheral device entry. In some implementations, the agent may provide the peripheral device entry, such as via network 160. In some implementations, the peripheral device entry may be uploaded by a user from the user device 140 via an interface provided by a central device agent, such as via a web page.

Determine entry association instructions 134 may determine whether the first peripheral device entry is associated with at least one second peripheral device entry, such as by determining whether the first peripheral device is already on the list of available peripheral devices. Such a determination may be made by comparing a plurality of metadata associated with the first peripheral device with a respective plurality of metadata associated with each of the peripheral devices on the list of available peripheral devices and matching at least one element of the plurality of metadata associated with the first peripheral device to at least one respective element of the respective plurality of metadata associated with the list of available peripheral devices. The metadata may comprise, for example, unique hardware identifiers, model names/numbers, network addresses (e.g., MAC address, IP address), device features, network credentials/groups, etc.

Each peripheral device entry may be stored and/or indexed, such as in a database. Links between associated peripheral devices may also be indicated in such entries, so as to enable production of a list of associated peripheral devices. Associated peripheral devices may comprise all peripheral devices associated with a particular group and/or location. For example, all printers, copiers, scanners, etc. located in a particular office may be used to generate a list of available peripheral devices.

The links and/or associations among the peripheral devices may be established by comparing the metadata associated with each of the peripheral device entries. For example, user device 140 may provide three peripheral device entries. If one of the peripheral device entries, such as for peripheral device 150, has a MAC address and/or serial number of an already received peripheral device entry, determine entry association instructions 134 may associated the other two peripheral device entries with any entries already associated with peripheral device 150. Similarly, if a later received peripheral device entry from a second user device matches a metadata characteristic matching one of the other two peripheral device entries received from user device 140, and other peripheral device entries received from the second user device may be aggregated into the list of available peripheral devices for both user device 140 and the second user device.

In some implementations, determine entry association instructions 134 may require that the amount of shared metadata characteristics exceeds some predetermined threshold before identifying user devices as representing the same customer, group and/or location. For example, both a MAC address and a serial number would need to match between entries to verify that the same peripheral device is being represented by the two entries. In some implementations, determine entry association instructions 134 may apply transitivity in determining that user devices are associated with the same customer, group, and/or location. This means that if printer A and printer B are considered to represent the same customer and printer B and printer C are considered to represent the same customer, then printer A and C are considered to represent the same customer.

Provide available device list instructions 136 may, in response to determining that the first peripheral device entry is associated with the at least one second peripheral device entry, provide a list of available peripheral devices to the user device, wherein the list of available peripheral devices comprises the first peripheral device and the at least one second peripheral device. For example, user device 140 may request a list of available peripheral devices. Provide available device list instructions 136 may then generate a list of all peripheral devices associated with a customer, group, location, etc. associated with user device 140. In some implementations, the user device 140 may provide an identifier and/or authentication to provide available device list instructions 136 to indicate which list of available peripheral devices should be provided. In some implementations, provide available device list instructions 136 may use the peripheral device entry(ies) supplied by user device 140 to identify associated devices, as described above, and provide the list of associated devices as the list of available peripheral devices.

In some implementations, the list of available peripheral devices may comprise a third peripheral device associated with the first peripheral device and the at least one second peripheral device based on a third peripheral device entry received from a local agent associated with the third peripheral device. For example, a user may register three printers with a central management agent, each of which may be identified by entry characteristics such as network address, unique hardware identifiers, serial numbers, presence of non-printer devices (such as PCs and their IP and/or MAC addresses) and/or environmental factors. For example, the printers may have access to smart thermostats, cameras, and/or microphones allowing for the capture of environmental factors for comparison and matching such as sound, temperature, and/or humidity history experienced by the printers. When the user initially installs a new, fourth printer in their environment, that printer may scan the network and/or other characteristics and provide its own peripheral device entry to the central management agent. The central management agent may then match any of the provided characteristics (e.g., the same four PCs with the same four MAC addresses may be present in the fourth printer's entry as are present in the second printer's entry) and associate the fourth printer with the existing fleet of three printers. When user device 140 receives the provided list of available peripheral devices, all four printers may be included without user device 140 needing to provide an entry for the newly installed fourth printer.

The characteristics included in a given peripheral device entry need not provide a perfect and/or complete match with existing peripheral devices to be associated with an existing list. For example, the environment in which the new printer is located may not include any information about any printers because all of the existing printers are USB connected to distinct PCs. One USB connected printer may provide a peripheral device entry describing an environment with devices having MAC addresses 1, 2, 5, 7, 9, and 15. Another USB connected printer may provide a peripheral device entry describing an environment with devices having MAC addresses 3, 5, 6, 7, 8, and 15. Because MAC addresses 5, 7, and 15 overlap and the chances of that overlap existing in multiple environments are low, the central management agent may determine that the two USB printers are in the same environment.

Figure 2:
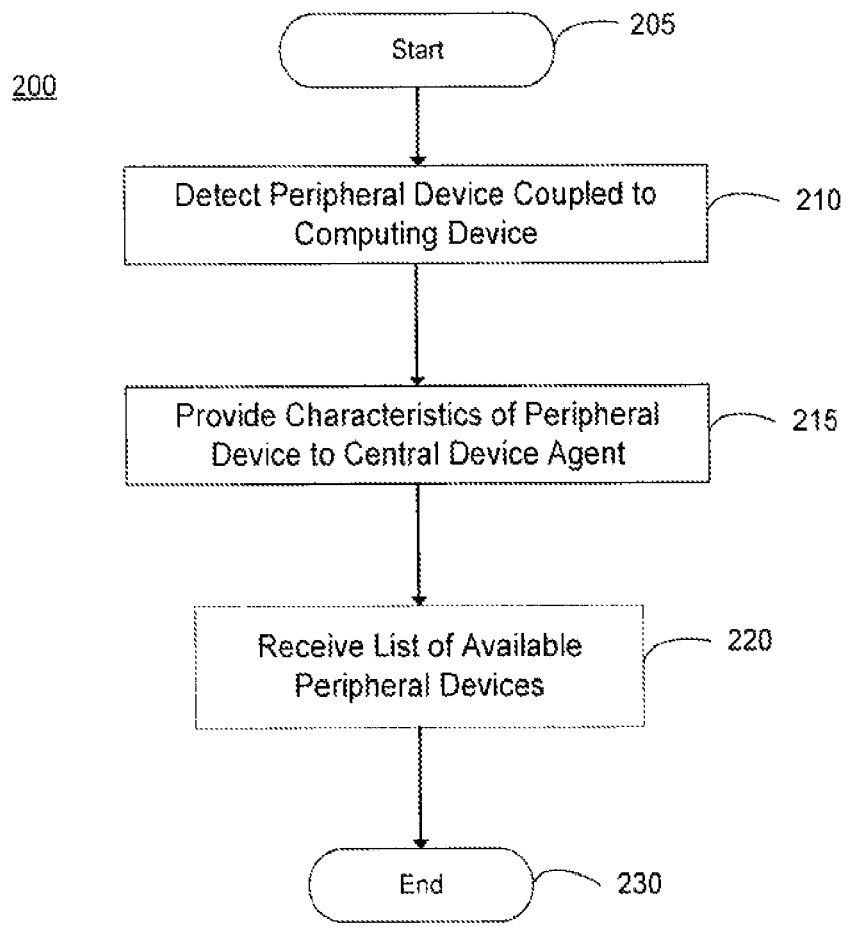
FIG. 2 is a flowchart of an example of a method for providing peripheral listing.

FIG. 2 is a flowchart of an example method 200 for providing peripheral listings consistent with disclosed implementations. Although execution of method 200 is described below with reference to the components of system 100, other suitable components for execution of method 200 may be used.

Method 200 may begin in stage 205 and proceed to stage 210 where user device 140 may detect a peripheral device coupled to a computing device. For example, user device 140 may scan for available peripheral devices in communication with the user device 140, such as by a physical connection (e.g., USB, FireWire, parallel, network, and/or serial cable) and/or by a wireless connection (e.g., WiFi and/or BlueTooth). In some implementations, the scan may be performed by a local software agent. Such an agent may execute on the peripheral device itself and/or on user device 140. For example, the agent may be installed at the same time a driver for the peripheral device is installed on user device 140.

Method 200 may then advance to stage 215 where user device 140 may provide characteristics of the peripheral device to a central device agent. For example, user device 140 may, upon detection of an available peripheral device 150, generate a peripheral device entry associated with peripheral device 150. The entry may then be communicated to a central device agent on computing device 100 via a communications medium such as network 160. In some implementations, the entry may comprise a plurality of metadata about peripheral device 150, such as the identifying agent, model number, features, MAC address, IP address, serial number, network name, and/or other identifying characteristics.

Method 200 may then advance to stage 220 where device 100 may receive a list of available peripheral devices. The list of other peripheral devices may comprise, for example, at least one second peripheral device comprising a matching characteristic of the plurality of characteristics. For example, provide available device list instructions 136 may, in response to determining that the first peripheral device entry is associated with the at least one second peripheral device entry, provide a list of available peripheral devices to the user device, wherein the list of available peripheral devices comprises the first peripheral device and the at least one second peripheral device. For example, user device 140 may request a list of available peripheral devices. Provide available device list instructions 136 may then generate a list of all peripheral devices associated with a customer, group, location, etc. associated with user device 140. In some implementations, the user device 140 may provide an identifier and/or authentication to provide available device list instructions 136 to indicate which list of available peripheral devices should be provided. In some implementations, provide available device list instructions 136 may use the peripheral device entry(ies) supplied by user device 140 to identify associated devices, as described above, and provide the list of associated devices as the list of available peripheral devices.

In some implementations, the list of peripheral devices may comprise a list of printing, scanning, shredding, copying, and/or multi-function devices. The list of peripheral devices may comprises a list of available features for each of the devices, such as paper sizes, duplexing, color, sorting, stapling, hole-punching, image manipulation, etc.

In some implementations, the computing device may provide an authentication to the central device agent. The authentication may be required to provide the plurality of characteristics to the central device agent and/or to receive the list of other peripheral devices available to the computing device. The authentication may be associated with the computing device itself and/or with a user of the computing device.

Method 200 may then end at stage 230.

Figure 3:
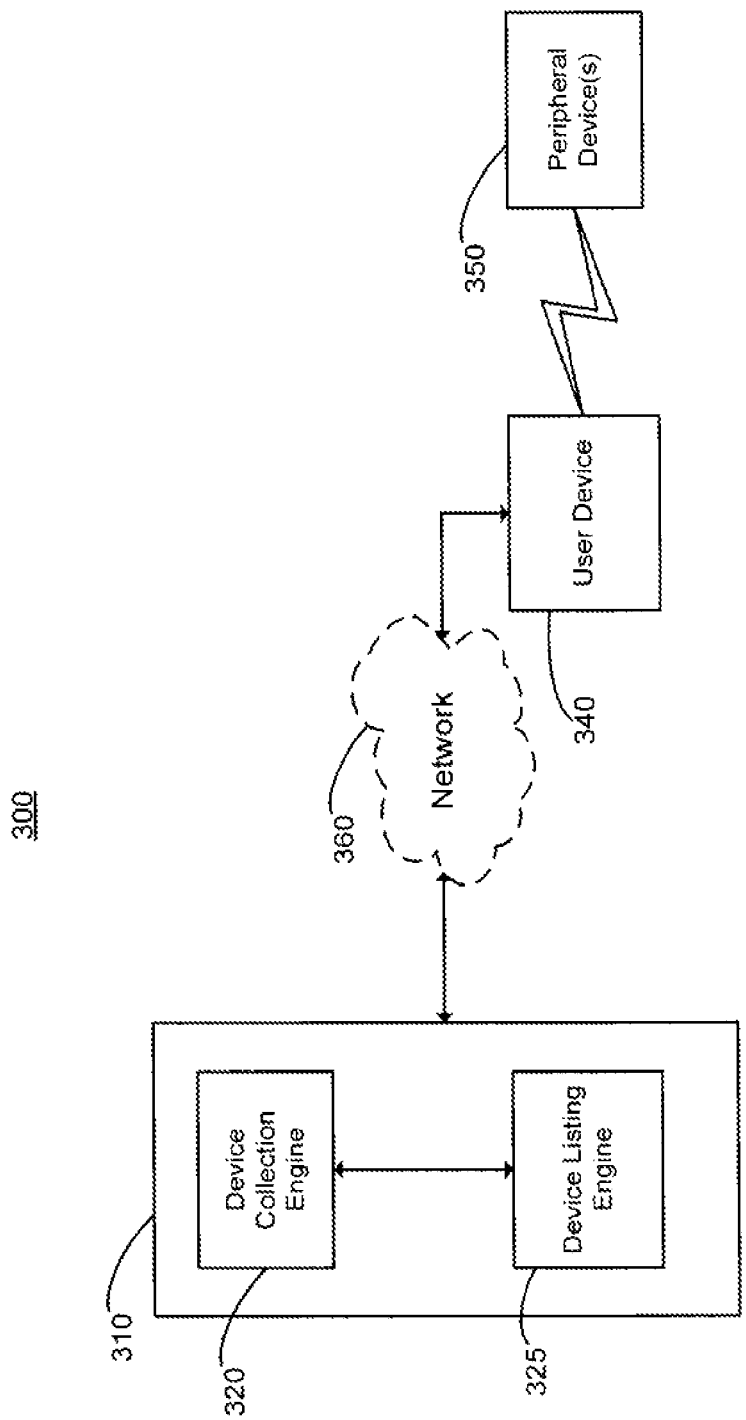
FIG. 3 is a block diagram of an example system for providing peripheral listings.

FIG. 3 is a block diagram of an example system 300 for providing a peripheral listing. System 300 may comprise a computing device 310 comprising device collection engine 320 and a device listing engine 325. Device collection engine 320 and device listing engine 325 may be associated with a single computing device 310 and/or may be communicatively coupled among different devices such as via a direct connection, bus, or network. Each of engines 320 and 325 may comprise hardware and/or software associated with computing devices. Computing device 310 may receive, from a user device 340, information about peripheral device(s) 350 via a communications medium such as network 360.

For example, device 310 may execute receive peripheral device entry instructions 132 to receive a first peripheral device entry from a user device 140. User device 140 may comprise, for example, a computer, laptop, smart phone, tablet, PDA, etc. User device 340 may scan for available peripheral devices in communication with the user device 340, such as by a physical connection (e.g., USB, FireWire, parallel, network, and/or serial cable) and/or by a wireless connection (e.g., WiFi and/or BlueTooth). In some implementations, the scan may be performed by a local software agent. Such an agent may execute on the peripheral device itself and/or on user device 340. For example, the agent may be installed at the same time a driver for the peripheral device is installed on user device 340.

User device 340 may, upon detection of an available peripheral device 150, generate a peripheral device entry associated with peripheral device 350. The entry may then be communicated to device 310 via a communications medium such as a network 360. For example, the entry may comprise a plurality of metadata about peripheral device 350, such as the identifying agent, model number, features, MAC address, IP address, serial number, network name, and/or other identifying characteristics.

Device collection engine 320 may receive a first list of peripheral device identifiers from a user device, determine whether the a first identifier of the first list of peripheral device identifiers is associated with a second list of peripheral device identifiers, and in response to determining that the first one identifier of the first list of peripheral device identifiers is associated with a second list of peripheral device identifiers, add a second identifier of the first list of peripheral device identifiers to the second list of peripheral device identifiers.

Device listing engine 325 may receive a request for a list of available peripheral devices from the user device and provide the second list of peripheral device identifiers to the user device. The second list of peripheral device identifiers may, for example, comprise an aggregation of a plurality of lists of peripheral device identifiers from a plurality of user devices.

For example, device listing engine 325 may execute determine entry association instructions 134 to determine whether the first peripheral device entry is associated with at least one second peripheral device entry, such as by determining whether the first peripheral device is already on the list of available peripheral devices. Such a determination may be made by comparing a plurality of metadata associated with the first peripheral device with a respective plurality of metadata associated with each of the peripheral devices on the list of available peripheral devices and matching at least one element of the plurality of metadata associated with the first peripheral device to at least one respective element of the respective plurality of metadata associated with the list of available peripheral devices. The metadata may comprise, for example, unique hardware identifiers, model names/numbers, network addresses (e.g., MAC address, IP address), device features, network credentials/groups, etc.

Each peripheral device entry may be stored and/or indexed, such as in a database. Links between associated peripheral devices may also be indicated in such entries, so as to enable production of a list of associated peripheral devices. Associated peripheral devices may comprise all peripheral devices associated with a particular group and/or location. For example, all printers, copiers, scanners, etc. located in a particular office may be used to generate a list of available peripheral devices.

The links and/or associations among the peripheral devices may be established by comparing the metadata associated with each of the peripheral device entries. For example, user device 340 may provide three peripheral device entries. If one of the peripheral device entries, such as for peripheral device 350, has a MAC address and/or serial number of an already received peripheral device entry, determine entry association instructions 134 may associated the other two peripheral device entries with any entries already associated with peripheral device 350. Similarly, if a later received peripheral device entry from a second user device matches a metadata characteristic matching one of the other two peripheral device entries received from user device 340, and other peripheral device entries received from the second user device may be aggregated into the list of available peripheral devices for both user device 340 and the second user device.

In some implementations, determine entry association instructions 134 may require that the amount of shared metadata characteristics exceeds some predetermined threshold before identifying user devices as representing the same customer, group and/or location. For example, both a MAC address and a serial number would need to match between entries to verify that the same peripheral device is being represented by the two entries. In some implementations, determine entry association instructions 134 may apply transitivity in determining that user devices are associated with the same customer, group, and/or location. This means that if printer A and printer B are considered to represent the same customer and printer B and printer C are considered to represent the same customer, then printer A and C are considered to represent the same customer.

Provide available device list instructions 136 may, in response to determining that the first peripheral device entry is associated with the at least one second peripheral device entry, provide a list of available peripheral devices to the user device, wherein the list of available peripheral devices comprises the first peripheral device and the at least one second peripheral device. For example, user device 140 may request a list of available peripheral devices. Provide available device list instructions 136 may then generate a list of all peripheral devices associated with a customer, group, location, etc. associated with user device 340. In some implementations, the user device 340 may provide an identifier and/or authentication to provide available device list instructions 136 to indicate which list of available peripheral devices should be provided. In some implementations, provide available device list instructions 136 may use the peripheral device entry(ies) supplied by user device 340 to identify associated devices, as described above, and provide the list of associated devices as the list of available peripheral devices.

The disclosed examples may include systems, devices, computer-readable storage media, and methods for peripheral listing. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions to:
   receive at a peripheral listing device, a first peripheral device entry from a user device executing a local agent, the first peripheral device entry generated by the user device and associated with a first peripheral device detected by the user device;
   determine whether the first peripheral device entry is associated with at least one second peripheral device entry; and
   in response to determining that the first peripheral device entry is associated with the at least one second peripheral device entry, provide a list of available peripheral devices to the user device, wherein the list of available peripheral devices comprises the first peripheral device and the at least one second peripheral device.

2. The non-transitory machine-readable medium of claim 1, wherein the instructions to determine whether the first peripheral device entry is associated with at least one second peripheral device entry comprise instructions to determine whether the first peripheral device is already on the list of available peripheral devices.

3. The non-transitory machine-readable medium of claim 2, wherein the instructions to determine whether the first peripheral device is already on the list of available peripheral devices comprise instructions to compare a plurality of metadata associated with the first peripheral device with a respective plurality of metadata associated with each of the peripheral devices on the list of available peripheral devices.

4. The non-transitory machine-readable medium of claim 3, wherein the instructions to determine whether the first peripheral device is already on the list of available peripheral devices comprise instructions to match at least one element of the plurality of metadata associated with the first peripheral device to at least one respective element of the respective plurality of metadata associated with the list of available peripheral devices.

5. The non-transitory machine-readable medium of claim 3, wherein the plurality of metadata comprises at least one of a unique hardware identifier and a network address.

6. The non-transitory machine-readable medium of claim 1, wherein the list of available peripheral devices comprises a third peripheral device associated with the first peripheral device and the at least one second peripheral device based on a third peripheral device entry received from a local agent associated with the third peripheral device.

7. A computer-implemented method, comprising:
   detecting with a user computing device, a first peripheral device coupled to the user computing device;
   providing from the user computing device, a plurality of characteristics associated with the first peripheral device to a central device agent on a peripheral listing device; and
   receiving a list of other peripheral devices available to the computing device from the central device agent, wherein the list of other peripheral devices comprises at least one second peripheral device comprising a matching characteristic of the plurality of characteristics.

8. The computer-implemented method of claim 7, wherein the list of peripheral devices comprise a list of printing devices.

9. The computer-implemented method of claim 8, wherein the list of peripheral devices comprises a list of available features for each of the printing devices.

10. The computer-implemented method of claim 7, further comprising providing an authentication to the central device agent.

11. The computer-implemented method of claim 10, wherein the authentication is required to provide the plurality of characteristics to the central device agent.

12. The computer-implemented method of claim 10, wherein the authentication is required to receive the list of other peripheral devices available to the computing device.

13. The computer-implemented method of claim 7, wherein the authentication is associated with a user of the computing device.

14. A system, comprising:
   a device collection engine on a computing device to:
      receive a first list of peripheral device identifiers from a local agent executing on a user device, the first list of peripheral device identifiers comprising available peripheral devices in communication with the user device,
      determine whether a first identifier of the first list of peripheral device identifiers is associated with a second list of peripheral device identifiers, and
      in response to determining that the first identifier of the first list of peripheral device identifiers is associated with a second list of peripheral device identifiers, add a second identifier of the first list of peripheral device identifiers to the second list of peripheral device identifiers; and
   a device listing engine on the computing device to:
      receive a request for a list of available peripheral devices from the user device, and
      provide the second list of peripheral device identifiers to the user device.

15. The system of claim 14, wherein the second list of peripheral device identifiers comprises an aggregation of a plurality of lists of peripheral device identifiers from a plurality of local agents.

* * * * *